United States Patent
Engst

[11] Patent Number: 5,972,470
[45] Date of Patent: Oct. 26, 1999

[54] ABSORPTION MAT AND METHOD OF MAKING SAME

[75] Inventor: Wilhelm Engst, Köln, Germany

[73] Assignee: Clouth Gummiwerke Aktiengesellschaft, Cologne, Germany

[21] Appl. No.: 08/775,570

[22] Filed: Dec. 31, 1996

Related U.S. Application Data

[63] Continuation-in-part of application No. 08/170,177, filed as application No. PCT/DE92/00419, May 23, 1992.

[30] Foreign Application Priority Data

Jun. 22, 1991 [DE] Germany ............................. 41 20 701
Nov. 7, 1991 [DE] Germany ............................. 41 36 647

[51] Int. Cl.$^6$ .............................. F16N 31/00; B01J 20/28; C09K 3/32
[52] U.S. Cl. .......................... 428/140; 428/143; 428/147; 428/156; 428/158; 428/139; 428/327; 184/106; 588/249; 588/255
[58] Field of Search .................................... 428/143, 147, 428/156, 158, 139, 140, 327; 184/106; 588/249, 255

[56] References Cited

U.S. PATENT DOCUMENTS

| | | | |
|---|---|---|---|
| 3,297,461 | 1/1967 | Siddall | 428/140 |
| 3,582,446 | 6/1971 | Stolki | 428/140 |
| 3,591,494 | 7/1971 | Crouch et al. | 210/680 |
| 4,481,335 | 11/1984 | Stark, Jr. | 525/261 |
| 4,484,661 | 11/1984 | Evenson | 220/573 |
| 4,497,147 | 2/1985 | Clapper et al. | 52/105 |
| 4,684,562 | 8/1987 | Hartkemeyer | 428/182 |
| 4,801,005 | 1/1989 | Hahn et al. | 141/98 |
| 4,826,030 | 5/1989 | Valley | 220/573 |
| 4,923,052 | 5/1990 | Englebert | 220/573 |
| 5,011,007 | 4/1991 | Kenimer | 206/205 |
| 5,020,638 | 6/1991 | Smith | 220/573 |
| 5,270,089 | 12/1993 | Alston et al. | 428/60 |

FOREIGN PATENT DOCUMENTS

| | | |
|---|---|---|
| 0348491 | 2/1979 | Austria . |
| 3608952 | 4/1987 | Germany . |
| 3122219 | 3/1992 | Germany . |
| 50-050279 | 5/1975 | Japan . |

OTHER PUBLICATIONS

Kirk–Othmer "Encyclopedia of Chemical Technology", Third Edition, vol. 16, pp. 433 to 434 and vol. 20, pp. 367 to 369, 432 to 433, 1982.

*Primary Examiner*—William P. Watkins, III
*Attorney, Agent, or Firm*—Walter Ottesen

[57] ABSTRACT

An absorption mat 1 receives organic hydrocarbons in liquid, paste-like or solid form, for example, oil, fats, fuels and solvents. The absorption mat includes a plate-like molded body 2 made of rubber granulate 3 or rubber shavings 3 bonded to each other to define a plate-like body. A base layer 6 resistant to the hydrocarbons is joined by vulcanization to the plate-like molded body 2. The base layer 6 is a composite base barrier layer including first and second layers (10, 12) made of hydrocarbon resistant material and a mesh-like support layer 14 is sandwiched and trapped between the first and second layers (10, 12) for preventing unwanted stretching of the mat during manufacture and when handling before placement on the ground or floor area and when in use.

22 Claims, 3 Drawing Sheets

ABSORPTION MAT AND METHOD OF MAKING SAME

RELATED APPLICATION

This is a continuation-in-part application of patent application Ser. No. 08/170,177, filed Dec. 22, 1993, which is a 371 application of PCT international patent application no. PCT/DE 92/00419, filed May 23, 1992.

FIELD OF THE INVENTION

The invention relates to an absorption mat, which is especially suited for organic hydrocarbons in liquid, paste-like or solid form, for example, for oils, fats, fuels or solvents. The invention also relates to a method of making the absorption mat.

BACKGROUND OF THE INVENTION

It is known that liquid, paste-like or solid hydrocarbons have a higher affinity for specific materials than with respect to water. Accordingly, the hydrocarbons can be received or absorbed in bodies manufactured from these materials.

Previously, these characteristics have rather been viewed as a disadvantage because a swelling of the components manufactured from the particular materials resulted.

The invention is, however, directed toward using the known characteristics of these materials in an advantageous manner in order to take up, trap or separate liquid, paste-like or solid hydrocarbons in order to protect the environment.

Any place where such hydrocarbons cannot be prevented from escaping or are emitted because of a work process or treating process, it is of special importance that these hydrocarbons do not directly reach the environment in an unwanted manner and especially that the substances do not reach the ground or are diverted thereto.

SUMMARY OF THE INVENTION

In view of the foregoing, it is an object of the invention to provide an absorption mat which can be placed on floors, ramps and service aisles in the area of service facilities or processing or manufacturing facilities or the like.

The absorption mat of the invention for absorbing hydrocarbons includes: a flat molded body having a plate or layer-like configuration; the body having an uncovered top surface completely exposed to receive the hydrocarbons thereon and the body having a bottom surface; the body being defined by granulate or shavings made of elastomer for absorbing and trapping the hydrocarbons therein; binding means for joining the granulate or shavings in a form-maintaining rigid bond with each other and to define a multiplicity of hollow spaces in the body communicating with each other and the top surface thereby facilitating the dispersal of the hydrocarbons within the body for absorption thereby; the binding means being resistant to hydrocarbons thereby causing the body to retain its overall shape in the presence of the hydrocarbons; the flat molded body having additional spaces formed therein to accommodate swelling of the flat molded body as the hydrocarbons become trapped therein; and, a composite base barrier layer joined to the flat molded body at the bottom surface thereof.

The plate-like molded body is made of oil and/or solvent absorbing material or oil and/or solvent receiving material on the basis of, for example, NR-rubber, IR-rubber, IIR-rubber or BR-rubber which is exposed to the hydrocarbons to be absorbed at one side, namely, from above. The composite base barrier layer is reinforced and made of a material which is oil and/or solvent resistant.

The composite base barrier layer includes first and second layers made of hydrocarbon resistant material and a mesh-like support layer sandwiched and trapped between said first and second layers for preventing unwanted stretching of said mat when handling before placement into service and when in use.

The plate-like molded body can be made of elastomers, which absorb or take up organic hydrocarbons, for example, NR-elastomers, RI-elastomers, IIR-elastomers, BR-elastomers, SBR-elastomers but also thermoplastic elastomers (TPE), thermoplasts or duroplasts.

For increasing the absorption capability, these materials can be processed in a porous, cellular or foamed form to define the plate-like molded body. Preferably, the molded body comprises rubber granulate joined to maintain a form or comprises rubber shavings.

The placement of absorption mats configured in this manner in the area of treatment and/or processing facilities affords the advantage that the organic hydrocarbons are reliably trapped when they drip onto the mat and are retained against an unwanted removal into the environment.

It has been proven advantageous according to the invention when the rubber granulate or the rubber shavings are bonded by oil and/or solvent resistant binding agents and/or by vulcanization to form the plate-like body.

An especially great effectiveness of the absorption mat is then obtained in accordance with the invention when the rubber granulate or the rubber shavings of the molded body are porous, for example, when they comprise cellular rubber, microcellular rubber or foam rubber. It is understood that the molded body can, however, contain also granulate or shavings made of solid material.

The invention provides that the plate-like molded body is provided over most of its thickness with recesses, for example, grooves, rills, slots, holes or a combination thereof so that the swelling of the rubber granulate or of the rubber shavings is possible without difficulty as the organic hydrocarbons are absorbed. It is, however, also possible to impart a profile to the entire surface of the molded body and/or the arrangement of inner spaces therein.

When an absorption mat according to the invention is saturated with aromatic hydrocarbons, the possibility of a thermal regeneration, for example, by means of water vapor, hot air or vacuum vapor is given as known per se. However, even combustion in combustion equipment suitable therefor can take place. Furthermore, it is possible to remove the hydrocarbons by pressing so that a limited further use of the absorption mat according to the invention is provided. The hydrocarbons removed in this manner are not chemically bonded in the rubber material and are located in the hollow spaces of the molded body because of capillary action.

The granulate or the shavings of the plate-like molded body can be joined by binding agents or glue resistant to the organic hydrocarbons, by latex processes and/or by vulcanization. The composite base barrier layer is fixedly bonded to the plate-like body by vulcanization. However, it is also possible to fix the plate-like molded body by cementing.

The composite base barrier layer is a structural base to which the absorbing layer receiving or absorbing the organic hydrocarbons is attached.

The absorption mat of the invention absorbs liquid hydrocarbons, such as oil, lubricants of low viscosity, motor fuels and organic solvents and selectively binds hydrocarbons from emulsions.

The configuration of the absorption layer with its communicating hollow spaces allows the organic liquid to distribute itself therein and then be permanently bonded to the granulates within the mat. The absorbed liquids are locked in the mat and cannot be squeezed or washed out.

The absorption mat of the invention protects the ground from harmful compounds. Whether for temporary or fixed installations, the mat is suitable for all areas where oil leakage problems occur. The absorption mat is best recommended for areas of storage, parking, cleaning or repair areas of mechanical equipment such as during maintenance of motor vehicles and in parking areas for locomotives.

On the other hand, it is also conceivable, according to the invention, to provide an enclosure with the insert made of a material receiving or absorbing organic hydrocarbons so that the engine-area, transmission-area, drive-area of a motor vehicle and especially a farm tractor is covered from below and/or enclosed to thereby prevent oils, fats and fuels of the particular vehicle from reaching the ground. In the case of an enclosure which exhibits these features, for the motor-area, transmission-area, drive-area of a motor vehicle, a noise absorption or noise attenuation is obtained as an additional effect.

It is also an object of the invention to provide a method of making the absorption mat of the invention. The method includes the steps of: providing a flat molded body having a plate configuration with the body being defined by granulate or shavings made of elastomer and with the granulate or shavings being joined by binding means; providing a mesh-like support layer having a plurality of apertures formed therein; skimming the mesh-like support layer on both sides thereof to form an unvulcanized composite base barrier layer having first and second layers made of hydrocarbon resistant nitrile rubber with the support layer sandwiched therebetween; placing the flat molded body atop the composite barrier layer; moving the flat molded body and the composite barrier layer together into a vulcanization press; simultaneously vulcanizing the flat molded body and the composite barrier layer causing the flat molded body and the composite barrier layer to join and causing the nitrile rubber of the first and second layers to join within the apertures thereby embedding the mesh-like support layer into the composite barrier layer; grabbing the unitary structure of the flat molded body and the composite barrier layer so as to engage the support layer and pulling the unitary structure from the vulcanization press; and, cutting a pattern of slots into the flat molded body and trimming the edges of the unitary structure thereby completing the making of the absorption mat.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
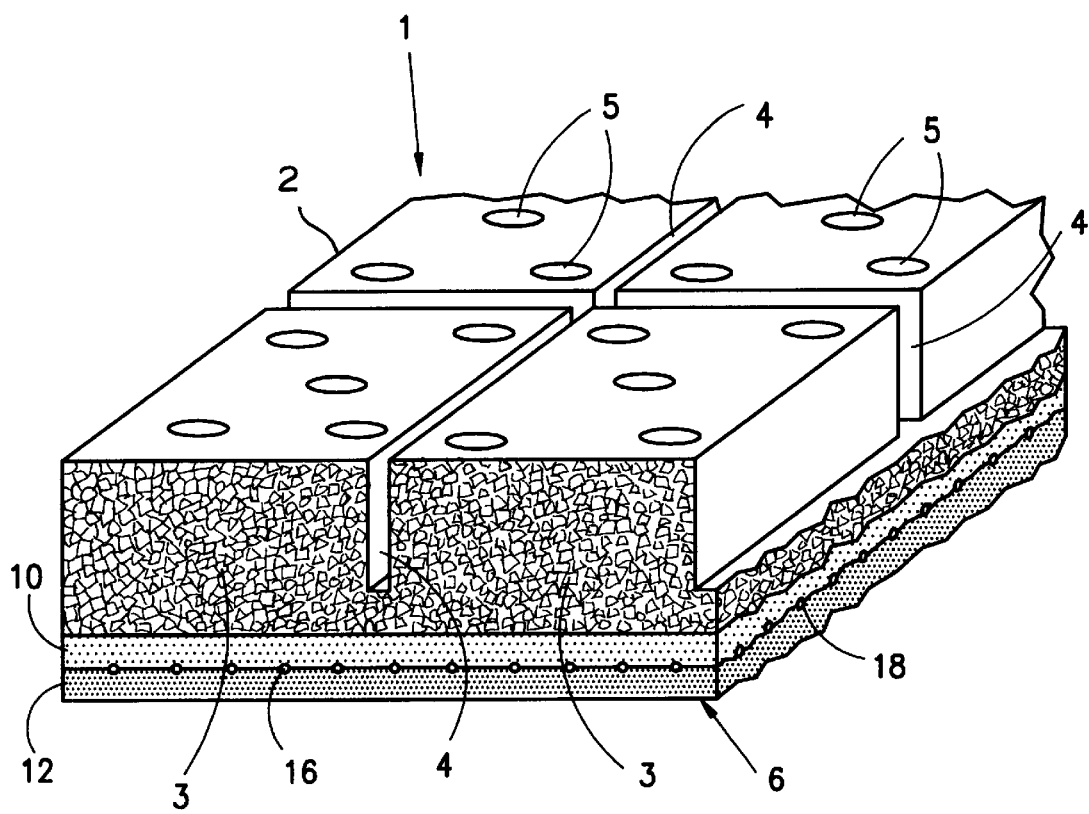
FIG. 1 is a perspective partial view in natural size of a first embodiment of an absorption mat.

The absorption mat 1 shown in the drawing of FIG. 1 is intended to be used especially for trapping liquid, paste-like or solid aromatic hydrocarbons. The absorption mat includes a plate-like molded body 2 which is made of rubber granulate 3 or rubber shavings 3. The rubber granulate or rubber shavings are brought into a bond which holds its shape. The following materials are suitable, for example, NR-elastomers, IR-elastomers, IIR-elastomers, BR-elastomers, SBR-elastomers, thermoplastic elastomers (TPE), thermoplasts or even duroplasts.

The granulate 3 or the shavings 3 can be a solid material as well as a porous material such as cellular rubber, microcellular rubber or foam rubber. The rigid bond between the individual granulate bodies or granulate shavings is obtained by adding oil resistant and/or solvent resistant binding agents and/or by vulcanization. A latex processing of the rubber granulate or the rubber shavings in advance of pressing the same and in advance of vulcanization is also conceivable.

The granulate and/or shavings 3 are held in the plate-like molded body 2 and can inherently swell after receiving the hydrocarbons. For this reason, it is important that the plate-like molded body 2 is provided with recesses at least over the greater part of its thickness. These recesses can, for example, be slots 4 or holes 5. It is, however, also possible to provide a combination of such slots and holes. Thus, the plate-like molded body 1 can be provided with slots 4 as well as with holes 5 as shown in FIG. 1. As absorption occurs, the mat swells thus closing up the slots and/or holes.

A composite base barrier layer 6 includes a first layer 10 and a second layer 12 made of hydrocarbon resistant material and a mesh-like support layer 14 sandwiched and trapped between the first and second layers. The layers (10, 12) are made, for example, of nitrile rubber.

Figure 3:
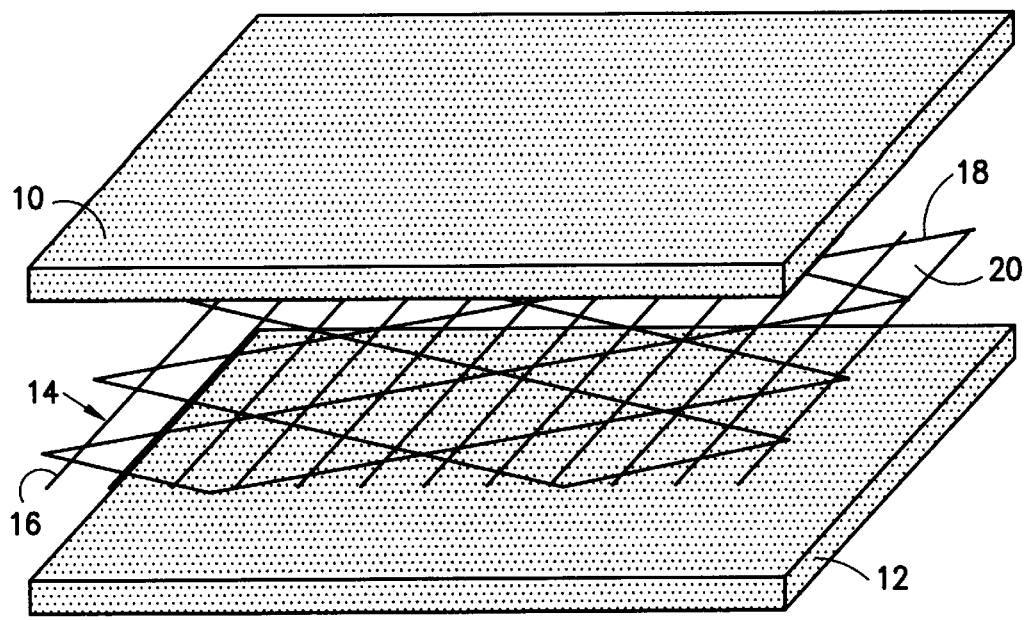
FIG. 3 is an exploded perspective view of the composite base barrier layer of the absorption mats shown in FIGS. 1 and 2.

The composite base barrier layer 6 is shown in detail in FIG. 3 and can be joined fixedly to the molded body 2 in a simple manner by vulcanization or cementing.

The molded body 2 can take up a relatively large quantity of liquid hydrocarbons with its rubber granulates or rubber shavings 3 before it has reached its saturation condition. Then, a thermal regeneration as known per se is possible such as by means of water vapor, hot air or vacuum vapor. However, a combustion in a combustion facility suitable therefor can also take place.

Furthermore, it is possible to press the hydrocarbons out of the molded body 2 so that a limited further use of the absorption mat 1 can be had. These hydrocarbons are disposed in the hollow spaces 9 of the molded body 2 because of capillary action.

Figure 2:
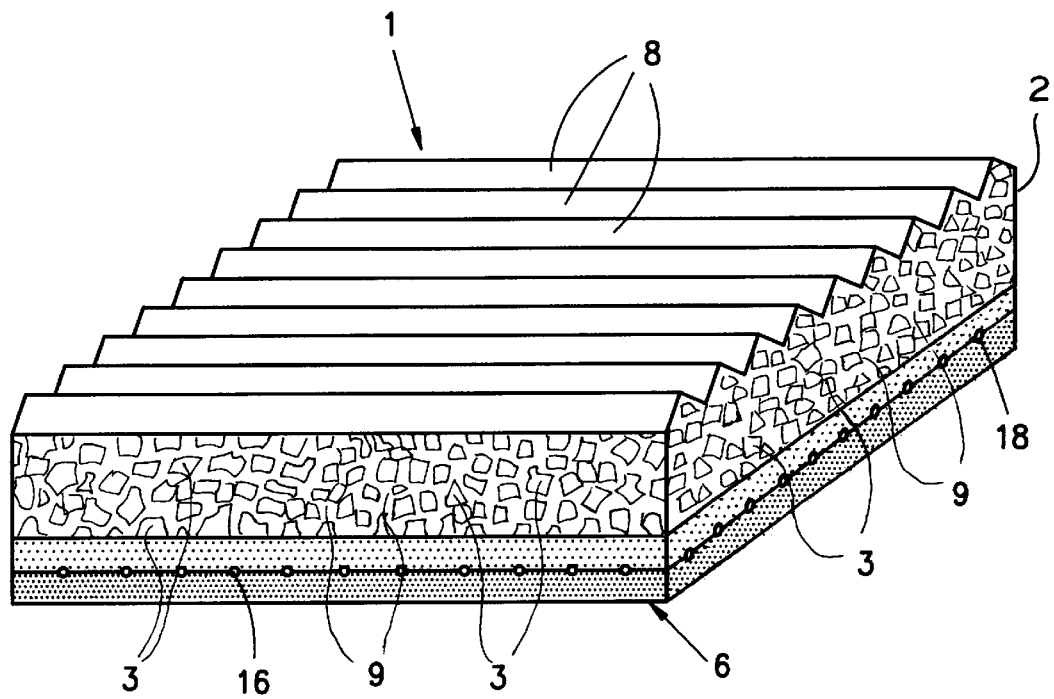
FIG. 2 is a second structural form of such an absorption mat.

In FIG. 2, a modified embodiment of an absorption mat 1 is shown. This embodiment distinguishes from that shown in FIG. 1 in that it includes a relatively coarse structure on its entire surface, for example, in the form of a profile 8. The profile 8 can, for example, comprise corrugations, waffle patterns, knurlings or even protuberances.

Furthermore, it has been shown to provide hollow spaces 9 in the interior of the plate-like molded body or granulate layer 2. These hollow spaces 9 can also be provided independently of the surface structuring. The hollow spaces 9 between the granulate 3 or the shavings 3 and the grain size of the granulate 3 or the shavings 3 can be so dimensioned in an advantageous manner that the swelling of the granulate parts or shaving parts does not lead to a significant outer deformation of the molded body 2.

The composite base barrier layer shown in FIG. 3 includes a first layer 10 and a second layer 12 made of hydrocarbon resistant material and a mesh-like support layer 14 sandwiched and trapped between the first and second layers. The support layer 14 prevents unwanted stretching of the mat 1 when handling before placement and when in use.

The first and second layers are preferably made of NBR (nitrile-butadiene rubber) and the rubber granulates of the granulate layer 2 are made preferably of NR (natural rubber) blended with some SBR (styrene-butadiene rubber). SBR is permissible but not required. The rubber granulate is obtained from used truck tires which are comprised mostly of NR and some SBR.

The mesh-like support layer 14 is especially useful during manufacture of the absorption mat and is also useful later to provide added support. During manufacture of the absorption mat, the plasticity of the unvulcanized nitrile rubber can lead to unwanted deformation during the manufacturing process. This deformation is countered with the aid of the mesh-like support layer 14 which takes up the tension forces. The support layer exhibits as little stretching as possible in order to hold the plastic and elastic deformations of the first and second layers (10, 12) to as low as possible. The support layer 14 imparts rigidity to the absorption mat also after vulcanization and thereby facilitates cutting operations (for example, to form the slots 4) thereon after the vulcanization.

The mesh-like support layer 14 comprises a plurality of polyester filaments arranged in parallel in warp direction. The polyester filaments 16 can be mutually separated by 5 to 8 mm. The filaments 16 extending in warp direction are supplemented with polyester filaments 18 arranged in weft direction. The warp filaments 16 and weft filaments 18 are joined to each other at their intersection points, for example, by gluing. The mesh-like support layer 14 is sourced from an external supplier and placed between the first and second layers (10, 12) during manufacture of the absorption mat.

Before vulcanization, the first and second layers (10, 12) are formed with the support layer 14 interposed therebetween in sandwich configuration. The nitrile rubber layers (10, 12) are pressed from above and below against the support layer and a certain adherence is provided between the two rubber layers made of raw nitrile rubber. This step is sufficient so that the two layers do not move relative to each other before being introduced into the vulcanization press. Before vulcanization, the nitrile rubber of the two layers penetrates and extends through the plurality of openings 20 conjointly defined by the warp and weft filaments (16, 18). During vulcanization, the nitrile rubber layers (10, 12) become vulcanized and permanently trap the mesh-like support layer therebetween.

Figure 4A:
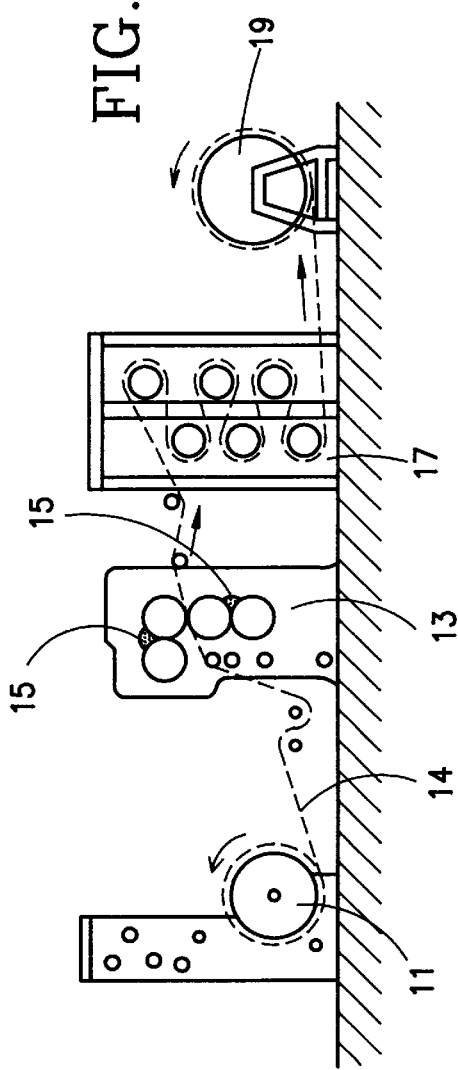
FIG. 4a is a schematic representation of the skimming operation for applying the layers of nitrile rubber to the mesh-like support layer.

The rubber layers (10, 12) of the composite base barrier layer 6 are applied utilizing a skimming operation as shown in FIG. 4a. The mesh-like support layer 14 of polyester filaments is unwound from a roll-off drum 11 and is passed through a four-roller calander 13 where the support layer 14 is coated in a skimming operation on both sides with a coating or layer of nitrile rubber. The skim mixture 15 of nitrile rubber is introduced between pairs of rollers of the calander as shown.

The support layer 14 coated on both sides is then passed to a drying tower 17 and cooled and thereafter wound on a roll-up drum 19 together with a foil which separates the turns of coated support layer on the roll-up drum.

As shown above, the first and second layers (10, 12) made of nitrile rubber are applied from above and from below to the support layer. This causes the raw rubber to be pressed through the openings 20 of the mesh-like support layer thereby establishing a degree of adherence between the two layers of raw nitrile rubber sufficient to trap and hold the support layer 14. Each of layers (10, 12) is about 1 mm thick.

Figure 4B:
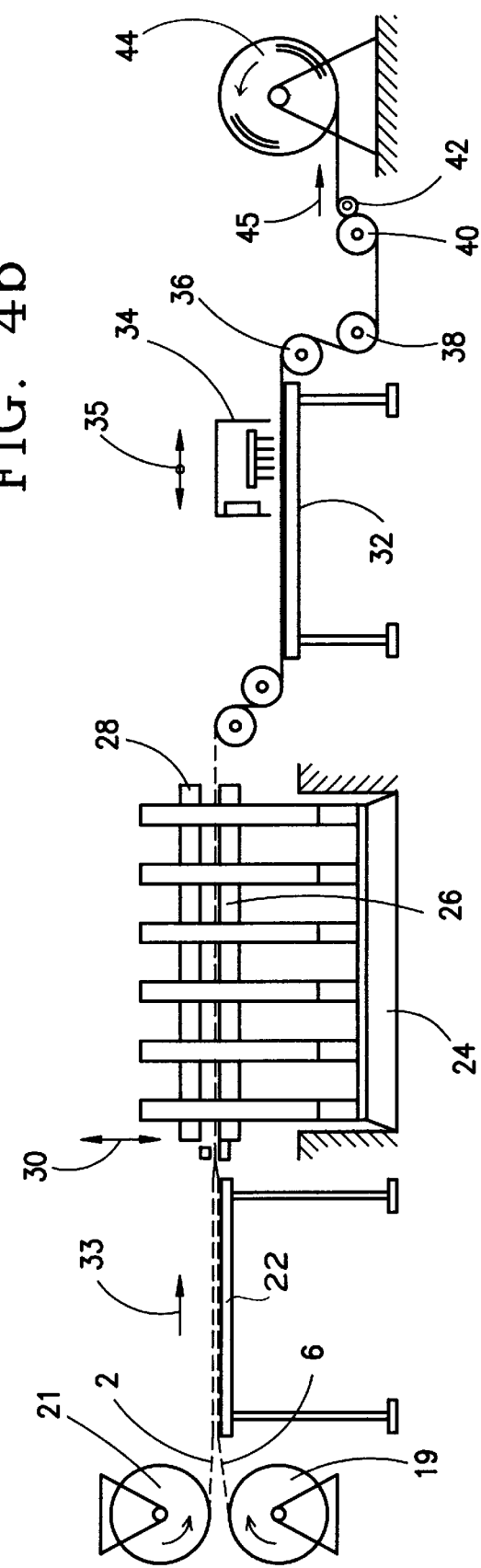
FIG. 4b is a schematic representation of the manufacturing process for producing the absorption mat in accordance with the method of the invention.

The granulate layer 2 is also preformed in advance of vulcanization and placed atop the composite base barrier layer 6 as shown in FIG. 4b. The granulate layer 2 is rolled off from roll-off drum 21 and the composite base barrier layer 6 from roll-off drum 19. The layer assembly (layers 2 and 6) is pulled over the slide table 22 in the direction of arrow 33 and introduced into the vulcanizing press 24 by pulling the composite base barrier layer 6 to the right as shown in FIG. 4b. In this way, the granulate layer 2 is pulled along with layer 6 and the pull force is transmitted via the support layer 14. If the support layer 14 were not present, then the mat could become distorted before vulcanization and this distortion would be imparted to the absorption mat during vulcanization. Thus, the support layer 14 imparts stability with respect to form during production of the absorption mat. The polyester filaments exhibit the least amount of stretching possible and therefore hold any plastic and elastic deformation of the layer assembly (layers 2 and 6) to a minimum.

In the vulcanizing press 24, the lower and upper plates (26, 28) of the press are heated and the upper plate 28 is movable as indicated by arrow 30. For vulcanization, the upper plate 28 is moved downwardly with pressure so that vulcanization takes place under pressure and heat causing a conversion from the plastic state to the rubber elastic state and a complete joining of the granulate layer 2 to the first layer 10 and the first and second layers (10, 12) to each other, thereby permanently trapping the mesh-like support layer 14. The lower and upper plates (26, 28) can be about 12 m long and 2.8 m wide so that segments of the absorption mat corresponding to these dimensions can be vulcanized during one operation. The forward end of the layer assembly protrudes from the vulcanizing press 24 approximately 1 m, at least initially, and a clamp is fixed to this exposed portion and also engages the support layer and the layer assembly is pulled from the press to the work table 32 with the pull force being transmitted via the support layer.

While on a work table 32, the profile (for example, slots 4) can be cut into the granulate layer 2 utilizing a movable frame 34 on which a plurality of knives is mounted. The frame 34 is movable in the direction of double arrow 35 as well as transversely to the longitudinal direction of the double arrow 35.

The completely vulcanized and profiled absorption mat can be cut into appropriate sizes as required for particular applications or be rolled onto a roll-up drum 44. The pair of rollers (36, 38) function to adjust tension in the vulcanized layer assembly (layers 2 and 6). Rollers (40, 42) guide the layer assembly to the roll-up drum 44 as it moves toward the drum 44 in the direction of arrow 45.

Figure 5:
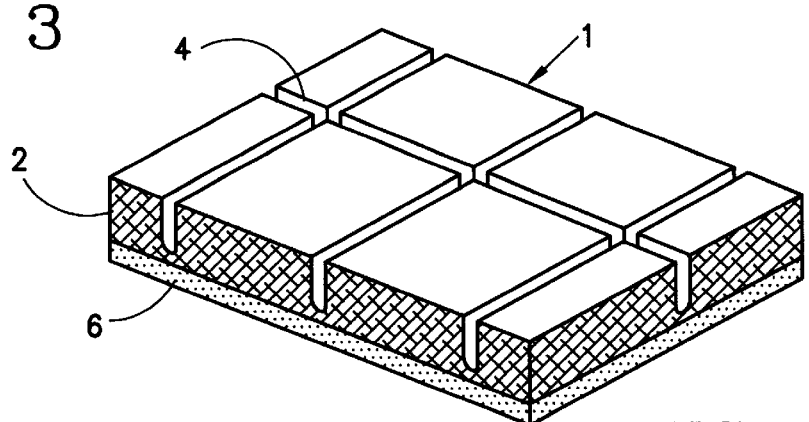
FIG. 5 is a perspective view of a preferred embodiment of the invention wherein only longitudinal and transverse slots are formed in the plate-like body of the absorption mat.

A preferred embodiment of the absorption mat of the invention is shown in FIG. 5 wherein the slots 4 are cut into the granulate layer 2 almost down to the composite base barrier layer 6.

Figure 6A:
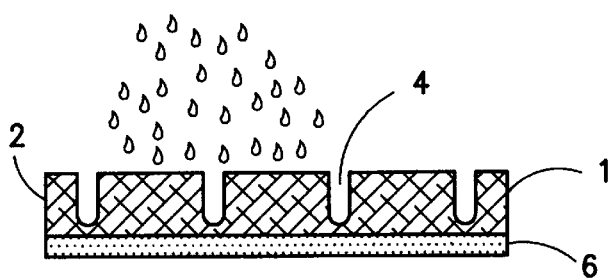
FIG. 6a is a side elevation view of the absorption mat of the invention subjected to a deposit of contamination such as waste oil; and, FIG. 6b shows the absorption mat of FIG. 6a after the oil has entered and become trapped in the absorption layer of the mat.
Figure 6B:
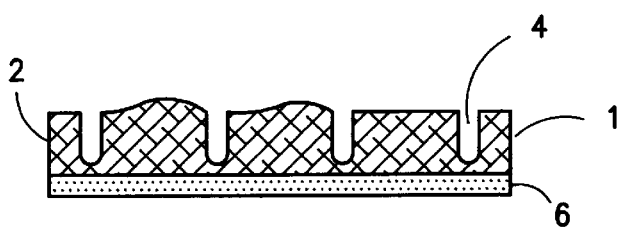

Personnel can walk on the absorption mat of the invention but liquid hydrocarbons collected therein will not leak therefrom because they are trapped, that is, the hydrocarbons are chemically bonded to the elastomer of the plate-like body 2. FIG. 6a shows a portion of the absorption mat of FIG. 5 subjected to waste oil. As shown in FIG. 6b, the flat molded layer 2 swells as the waste oil accumulates therein. For this reason, the slots 4 help compensate for this swelling thereby enabling the absorption mat to retain its overall shape. As absorption continues, the mat swells ultimately closing up the slots 4. When the slots are closed over, the absorption capacity of the absorption mat is reached. If the slots 4 were not provided, the surface of the absorption mat would become excessively bulgy.

Typically, with an overall thickness of 20 mm of the absorption mat, an absorption capacity per $m^2$ is approximately 10 liters. The weight of the mat is approximately 16 $kg/m^2$.

It is understood that the foregoing description is that of the preferred embodiments of the invention and that various changes and modifications may be made thereto without departing from the spirit and scope of the invention as defined in the appended claims.

What is claimed is:

1. An absorption mat for absorbing hydrocarbons in liquid, paste or solid form including oils, fats, fuels and solvents, the absorption mat being suitable for placement in a work area for use by personnel and the absorption mat comprising:

a flat molded body having a plate configuration;

said body having an uncovered top surface completely exposed to receive said hydrocarbons thereon and said body having a bottom surface;

said body being defined by granulate or shavings made of elastomer for absorbing and trapping said hydrocarbons therein;

binding means for joining said granulate or shavings in a form-maintaining rigid bond with each other and to define a multiplicity of hollow spaces in said body communicating with each other and said top surface thereby facilitating the dispersal of said hydrocarbons within said body for absorption thereby;

said binding means being resistant to hydrocarbons thereby causing said body to retain its overall shape in the presence of said hydrocarbons;

said flat molded body having additional spaces formed therein to accommodate swelling of said flat molded body as the hydrocarbons become trapped therein;

a composite base barrier layer joined to said flat molded body at said bottom surface thereof; and, said composite base barrier layer including: first and second layers made of hydrocarbon resistant material and a mesh support layer sandwiched and trapped between said first and second layers for preventing unwanted stretching of said mat when handling before placement and when in use.

2. The absorption mat of claim 1, said first and second layers being made of nitrile rubber and said mesh support layer being a web of interconnected plastic filaments.

3. The absorption mat of claim 2, said web including a plurality of warp filaments extending in warp direction and a plurality of weft filaments extending transversely to said warp filaments to define a plurality of intersect points; and, adhesive means for joining said warp filaments to said weft filaments at said intersect points.

4. The absorption mat of claim 1, said mesh support layer defining a plurality of apertures therein; said first and second layers being made of nitrile rubber vulcanized to cause the vulcanized rubber to extend into said apertures whereat said layers are mutually joined to trap and embed said mesh-like support layer in said composite base barrier layer.

5. The absorption mat of claim 1, said elastomer being selected from the group consisting of: natural rubber elastomer, isoprene rubber elastomer, isobutylene isoprene copolymer elastomer, butadiene rubber elastomer and thermoplastic elastomer.

6. The absorption mat of claim 1, wherein said molded body is made of a material processed to be porous or cellular.

7. The absorption mat of claim 1, wherein said granulate or said shavings of said molded body are porous and are made of a material selected from the group consisting of cellular rubber, microcellular rubber and foam rubber.

8. The absorption mat of claim 1, wherein said hollow spaces between said granulate or said shavings and the grain size of said granulate or said shavings are so dimensioned that outer deformations of said molded body are avoided when said granulate or said shavings swell in the presence of said hydrocarbons.

9. The absorption mat of claim 1, wherein said binding means is selected from the group consisting of a binding agent, a latex process and vulcanization.

10. The absorption mat of claim 1, said additional spaces being a plurality of cutouts formed therein thereby providing space to accommodate swelling of said molded body as said hydrocarbons become trapped therein.

11. The absorption mat of claim 10, said cutouts including at least one of slots, rills, holes and inner hollow spaces.

12. The absorption mat of claim 10, wherein: said molded body has a thickness measured from said top surface; and, said cutouts are formed therein so as to extend from said top surface to at least over half of said thickness.

13. The absorption mat of claim 1, wherein said additional spaces are a plurality of slots in said body.

14. The absorption mat of claim 1, said composite base barrier layer being joined by vulcanization to said flat molded body at said bottom surface thereof.

15. An absorption mat for absorbing hydrocarbons in liquid, paste or solid form including oils, fats, fuels and solvents, the absorption mat being suitable for placement in a work area for use by personnel and the absorption mat comprising:

a flat molded body having a plate configuration;

said body having an uncovered top surface completely exposed to receive said hydrocarbons thereon and said body having a bottom surface;

said body being defined by granulate or shavings made of elastomer for absorbing and trapping said hydrocarbons therein;

binding means for joining said granulate or shavings in a form-maintaining rigid bond with each other and to define a multiplicity of hollow spaces in said body communicating with each other and said top surface thereby facilitating the dispersal of said hydrocarbons within said body for absorption thereby;

said binding means being resistant to hydrocarbons thereby causing said body to retain its overall shape in the presence of said hydrocarbons;

said flat molded body having additional spaces formed therein to accommodate swelling of said flat molded body as the hydrocarbons become trapped therein;

a composite base barrier layer joined by vulcanization to said flat molded body at said bottom surface thereof;

said composite base barrier layer including: first and second layers made of hydrocarbon resistant material and a mesh support layer sandwiched and trapped between said first and second layers for preventing unwanted stretching of said mat when handling before placement and when in use;

said granulate or said shavings of said molded body being porous and made of a material selected from the group consisting of cellular rubber, microcellular rubber and foam rubber; and, said hollow spaces between said granulate or said shavings and the grain size of said granulate or said shavings being so dimensioned that outer deformations of said molded body are avoided when said granulate or said shavings swell in the presence of said hydrocarbons whereby said flat molded body retains its overall shape notwithstanding absorbed hydrocarbons trapped therein.

16. The absorption mat of claim 15, wherein said binding means is selected from the group consisting of a binding agent, a latex process and vulcanization.

17. The absorption mat of claim 15, said additional spaces being a plurality of cutouts formed therein thereby providing space to accommodate swelling of said molded body as said hydrocarbons become trapped therein.

18. The absorption mat of claim 17, said cutouts including at least one of slots, rills, holes and inner hollow spaces.

19. The absorption mat of claim 17, wherein: said molded body has a thickness measured from said top surface; and, said cutouts are formed therein so as to extend from said top surface to at least over half of said thickness.

20. The absorption mat of claim 15, wherein said additional spaces are a plurality of slots in said body.

21. An absorption mat for absorbing hydrocarbons in liquid, paste or solid form including oils, fats, fuels and solvents, the absorption mat being suitable for placement in a work area for use by personnel and the absorption mat comprising:

a flat molded body having a plate configuration;

said body having an uncovered top surface completely exposed to receive said hydrocarbons thereon and said body having a bottom surface;

said body being defined by granulate or shavings made of elastomer for absorbing and trapping said hydrocarbons therein;

binding means for joining said granulate or shavings in a form-maintaining rigid bond with each other and to define a multiplicity of hollow spaces in said body communicating with each other and said top surface thereby facilitating the dispersal of said hydrocarbons within said body for absorption thereby;

said binding means being resistant to hydrocarbons thereby causing said body to retain its overall shape in the presence of said hydrocarbons;

a composite base barrier layer joined to said flat molded body at said bottom surface thereof;

said composite base barrier layer including: first and second layers made of hydrocarbon resistant material and a mesh support layer sandwiched and trapped between said first and second layers for preventing unwanted stretching of said mat when handling before placement and when in use; and, said hollow spaces between said granulate or said shavings and the grain size of said granulate or said shavings being so dimensioned that outer deformations of said molded body are avoided when said granulate or said shavings swell in the presence of said hydrocarbons whereby said flat molded body retains its overall shape notwithstanding absorbed hydrocarbons trapped therein.

22. The absorption mat of claim 21, said composite base barrier layer being joined by vulcanization to said flat molded body at said bottom surface thereof.

* * * * *